(No Model.)
W. S. CLARK.
EXPANSIBLE PLUG FOR TESTING PIPES.
No. 437,289. Patented Sept. 30, 1890.
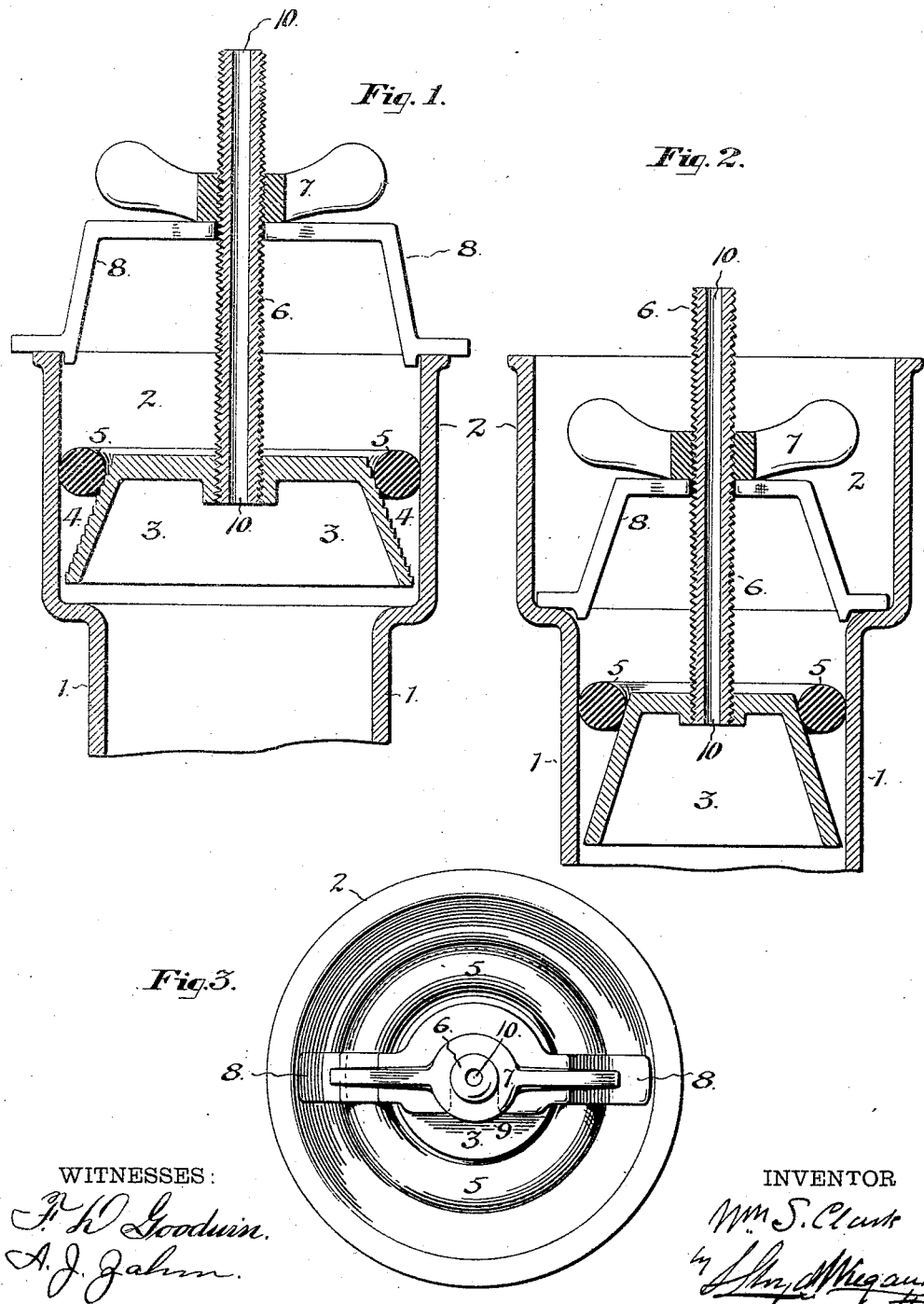
WITNESSES:
F. W. Goodwin.
A. J. Jahn.
INVENTOR
Wm S. Clark
by Henry Wiegand
atty

UNITED STATES PATENT OFFICE.

WILLIAM S. CLARK, OF PHILADELPHIA, PENNSYLVANIA.

EXPANSIBLE PLUG FOR TESTING PIPES.

SPECIFICATION forming part of Letters Patent No. 437,289, dated September 30, 1890.

Application filed May 10, 1890. Serial No. 351,365. (No model.)

*To all whom it may concern:*

Be it known that I, WILLIAM S. CLARK, a citizen of the United States, residing at Philadelphia, in the county of Philadelphia and State of Pennsylvania, have invented certain new and useful Improvements in Expansible Plugs for Testing Pipes; and I do hereby declare the following to be a sufficiently full, clear, and exact description thereof as to enable others skilled in the art to make and use the said invention.

This invention relates to plugs or stoppers for closing the ends and branches of pipes for the purposes of testing and disinfecting the same, and has for its object the reduction in weight of such stoppers, the more convenient application thereof to use, the automatic tightening thereof when under pressure, and a reduction in the cost of producing them.

The nature of this invention consists in a tapering hollow plug surrounded by an elastic ring, which rolls between the internal surface of the pipes and the external surface of the plug as the plug is drawn outwardly from the pipe, and which tightens by the application of fluid-pressure in the pipe.

The construction of this invention is hereinafter fully described, and shown in the accompanying drawings, in which—

Figure 1 shows the invention in section applied in the bell end of a drain-pipe; Fig. 2, a modified form thereof, also in section, applied in the straight portion of a pipe; and Fig. 3, an end view thereof.

1 represents a soil-pipe; 2, the bell end thereof. These parts are of the usual form of construction and form no part of the invention, but are illustrated and referred to to show its application.

3 is a hollow plug, with its larger end placed inwardly in the pipe 1, as shown in Figs. 2 and 3, and in the bell end 2, as shown in Fig. 1. The plug in its external tapering surfaces, as shown in Fig. 1, is of a short or blunt taper and has small circumferential grooves 4 formed in it, with intervening circumferential ridges, as shown in Figs. 2 and 3, is of a longer taper, and is smooth on its outer surfaces.

Around the plug 3 is placed a ring of vulcanized india-rubber 5, which is passed between the plug 3 and the interior of the pipe 1 or bell end 2, as the case may require.

Fastened securely in the plug 3 is a tubular screw 6, provided with a nut 7, resting upon a bridge 8, which bridge 8 is preferably made with an opening or cleft 9 in the side of the eye, so that it can be easily applied without removing the nut 7 from the screw 6. The bridge 8 when in use rests upon the end of the pipe or bell end, as shown in Fig. 1, or on the shoulder thereof, as shown in Fig. 2.

The tubular channel through the screw 6 affords a means of attaching tubes or other apparatus for introducing the testing-fluid or disinfecting agents or pressure-indicating apparatus in the same manner as in other plugs used for like purposes.

The ring 5 is shown as of circular cross-section, but may be of elliptic, rectangular, or other cross-section, so that it is not too flat or thin in one direction as compared with another to roll between the plug 3 and the interior of the pipe under test.

In applying the plug to use it is inserted with the larger end inward. The ring 5 is pushed in, so as to make contact with the inner surface of the pipe. The bridge 8 is then applied and the nut 7 turned on the screw 6, drawing the plug 3 and rolling the ring 5 in the converging space between it and the inner surface of the pipe. Upon application of fluid-pressure in the pipe the plug 3 compresses and rolls the ring 5, still further tightening the plug against leakage.

It is obvious from the form of the parts, as shown, that but little material is required to make them, and they are therefore correspondingly light, portable, and inexpensive.

Having described this invention, what I claim is—

The tubular screw 6, provided with a nut 7 and tapering plug 3, in combination with an elastic ring 5, adapted to roll upon the said plug 3 when applied in closing pipe-openings, substantially as and for the purpose set forth.

WILLIAM S. CLARK.

Witnesses:
E. C. PARAMORE,
J. DANIEL EBY.